US010039359B2

(12) United States Patent
Barron

(10) Patent No.: US 10,039,359 B2
(45) Date of Patent: Aug. 7, 2018

(54) CATASTROPHIC EVENT RESPONSIVE TRAVEL CASE WITH FLOTATION AND ALERTING

(71) Applicant: Jack Barron, Southboro, MA (US)

(72) Inventor: Jack Barron, Southboro, MA (US)

( * ) Notice: Subject to any disclaimer, the term of this patent is extended or adjusted under 35 U.S.C. 154(b) by 0 days.

(21) Appl. No.: 15/418,672

(22) Filed: Jan. 27, 2017

(65) Prior Publication Data

US 2017/0367452 A1   Dec. 28, 2017

Related U.S. Application Data

(60) Provisional application No. 62/355,455, filed on Jun. 28, 2016.

(51) Int. Cl.

| | |
|---|---|
| *G01S 19/14* | (2010.01) |
| *A45C 13/00* | (2006.01) |
| *A45C 5/14* | (2006.01) |
| *A45C 13/26* | (2006.01) |
| *B63C 9/20* | (2006.01) |
| *B63C 9/00* | (2006.01) |
| *B63C 9/04* | (2006.01) |

(52) U.S. Cl.
CPC ............ *A45C 13/001* (2013.01); *A45C 5/14* (2013.01); *A45C 13/262* (2013.01); *G01S 19/14* (2013.01); *B63C 9/20* (2013.01); *B63C 2009/0017* (2013.01); *B63C 2009/042* (2013.01)

(58) Field of Classification Search
CPC .... G01S 19/14; B63C 2009/0017; B63C 9/20
USPC ........................................................ 340/8.1
See application file for complete search history.

(56) References Cited

U.S. PATENT DOCUMENTS

| | | |
|---|---|---|
| 1,805,803 A | 5/1931 | Bulgarini |
| 3,587,794 A | 6/1971 | Mattel |
| 3,805,929 A | 4/1974 | Kuwayama |
| 4,044,867 A | 8/1977 | Fisher |
| 4,157,134 A | 6/1979 | Stoll |
| 4,164,970 A | 8/1979 | Jordan |
| 4,503,558 A | 3/1985 | Lief et al. |
| 4,569,082 A | 2/1986 | Ainsworth et al. |
| 4,854,732 A | 8/1989 | Italici |
| 4,966,279 A | 10/1990 | Pearcy |
| 5,316,096 A | 5/1994 | Good |
| 5,408,238 A | 4/1995 | Smith |

(Continued)

FOREIGN PATENT DOCUMENTS

CN    103689897 A    4/2014

OTHER PUBLICATIONS

Thukral, Deepa, "Self Propelled Suitcase: The first of its kind to be released" available at http://luxurylaunches.com/travel/self_propelled_suitcase_the_first_of_its_kind_to_be_released.php dated Mar. 31, 2009, 2 pages.

(Continued)

*Primary Examiner* — Vernal Brown
(74) *Attorney, Agent, or Firm* — Gary S. Engelson

(57) ABSTRACT

A travel case includes a case body defining an interior cavity in which to carry articles and an exterior shell; an inflatable floatation aid fixed to the exterior shell; an inflator in communication with the inflatable floatation aid, for inflation of the inflatable floatation aid; and a locator beacon fixed to the exterior shell, including a communications transmitter capable of signaling a remote party and a geolocating apparatus.

27 Claims, 12 Drawing Sheets

(56) References Cited

U.S. PATENT DOCUMENTS

| | | | |
|---|---|---|---|
| 5,605,482 A * | 2/1997 | Choy | B63C 9/24 441/106 |
| 5,823,550 A | 10/1998 | Bennett et al. | |
| 5,957,583 A * | 9/1999 | DeClements, Jr. | A45C 3/04 383/10 |
| 5,967,390 A | 10/1999 | Goryl | |
| 6,208,269 B1 | 3/2001 | Brodie et al. | |
| 6,265,975 B1 | 7/2001 | Zimmerman | |
| 6,334,537 B1 | 1/2002 | Tepper | |
| 6,439,941 B2 | 8/2002 | McClure et al. | |
| 6,502,656 B2 | 1/2003 | Weiss et al. | |
| 6,545,606 B2 * | 4/2003 | Piri | B63C 9/0005 340/539.13 |
| 6,558,218 B1 | 5/2003 | Hansen | |
| 7,176,832 B2 | 2/2007 | Bruno et al. | |
| 7,483,337 B2 | 1/2009 | Basilico | |
| 7,561,037 B1 | 7/2009 | Monroe | |
| 7,830,305 B2 | 11/2010 | Boling et al. | |
| 7,969,822 B2 | 6/2011 | Basilico | |
| 8,276,692 B1 | 10/2012 | Nwaeke | |
| 8,319,630 B1 | 11/2012 | Salwan | |
| 8,434,577 B1 | 5/2013 | Al-Qaffas | |
| 8,622,263 B2 | 1/2014 | Su | |
| 8,669,865 B2 | 3/2014 | Al-Rehaili et al. | |
| 8,720,751 B2 | 5/2014 | Alsaffar | |
| 8,727,263 B2 | 5/2014 | Fabre et al. | |
| 8,794,484 B2 | 8/2014 | Vezzosi | |
| 8,851,215 B2 | 10/2014 | Goto | |
| 8,998,666 B1 | 4/2015 | Albright | |
| 9,031,497 B1 | 5/2015 | Hoffman et al. | |
| 9,162,737 B1 | 10/2015 | Leatherman | |
| 9,162,738 B1 * | 10/2015 | Faletra | B63B 7/08 |
| 9,187,183 B2 | 11/2015 | Argillier et al. | |
| 9,223,027 B1 | 12/2015 | Albright | |
| 9,330,554 B2 | 5/2016 | Calvar Antón et al. | |
| 9,354,323 B2 | 5/2016 | Anderson et al. | |
| 9,407,352 B1 | 8/2016 | Hoffman et al. | |
| 9,452,844 B1 | 9/2016 | Ye et al. | |
| 9,637,209 B1 * | 5/2017 | Brown | B63C 9/20 |
| 2003/0049981 A1 * | 3/2003 | Mackal | B63C 9/18 441/92 |
| 2004/0129469 A1 | 7/2004 | Kader | |
| 2004/0157514 A1 | 8/2004 | Courtney | |
| 2005/0040987 A1 * | 2/2005 | Bruno | B63C 9/0005 342/357.31 |
| 2006/0207849 A1 | 9/2006 | Sadow | |
| 2007/0131462 A1 | 6/2007 | Hemsley | |
| 2007/0256904 A1 | 11/2007 | Ribaut | |
| 2010/0102065 A1 * | 4/2010 | Phelan | B63B 1/041 220/560 |
| 2011/0065344 A1 | 3/2011 | Breuer et al. | |
| 2011/0150367 A1 | 6/2011 | Ribaut | |
| 2011/0153193 A1 * | 6/2011 | Fox | G01C 21/20 701/533 |
| 2011/0240692 A1 | 10/2011 | Park | |
| 2012/0006865 A1 | 1/2012 | Su | |
| 2012/0118691 A1 | 5/2012 | Ribaut | |
| 2012/0138741 A1 | 6/2012 | Fabre et al. | |
| 2013/0048456 A1 | 2/2013 | Govor | |
| 2013/0214942 A1 | 8/2013 | Joss | |
| 2014/0061273 A1 * | 3/2014 | Bullivant | A45F 3/04 224/576 |
| 2014/0107868 A1 | 4/2014 | DiGiacomcantonio et al. | |
| 2014/0142803 A1 | 5/2014 | Argillie et al. | |
| 2015/0122893 A1 * | 5/2015 | Warther | G06K 7/10366 235/492 |

OTHER PUBLICATIONS

Grobart, Sam, "Robotic Luggage Doesn't Deliver" JPMorgan Profit Beats Estimates on Pay Cuts, Trading Results—Bloomberg, available at http://www.bloomberg.com/news/articles/2016-04-13/jpmorgan-first-quarter-profit-declines-6-7-on-bond-stock-slump, dated Oct. 8, 2012, 4 Pages.

"Self-driving luggage opportunity" from DDL Wiki, available at https://wiki.ece.cmu.edu/ddl/index.php/Self-driving_luggage_opportunity, dated Feb. 25, 2014, 12 pages.

"12 Smart and Innovative Suitcases", available at http://www.crookedbrains.net/2014/12/smart-and-innovative-suitcases.html, dated Dec. 17, 2014, 9 pages.

"10 'smart luggage' options for tech-savvy travelers-CIO", available at http://www.cio.com/article/2946552/consumer-electronics/10-smart-luggage-options-for-tech-savvy-travelers.html#slide1, Jul. 10, 2015, 13 pages.

Chua, Mike, "Suitcase Archives—MIKESHOUTS" available at http://mikeshouts.com/tag/suitcase/ dated Apr. 1, 2016, 13 pages.

"Trunkster | Unconventional Luggage", available at http://www.trunkster.co/, dated Oct. 3, 2016, 5 pages.

The World's First Power Assisted Luggage—a Breakthrough in Travel | Business Wire, available at http://www.businesswire.com/news/home/20080623005954/en/Worlds-Power-Assisted-Luggage—Breakthrough-Travel, World Premiere Jun. 26, 2008, 4 pages.

* cited by examiner ated only from the point of view of improving or enhancing black box functionality to aid in the location of a downed aircraft, and the point of view of improving or enhancing the regular communication of aircraft location and navigation information to satellite and/or ground stations to pinpoint the path, speed, altitude, etc. of an aircraft immediately preceding a catastrophic incident. But, no one has considered that each passenger or piece of equipment carried aboard a plane, vessel, or vehicle may provide the means for self-rescue or, in the event of an utter catastrophe, location and recovery of the wreckage. The present invention may have application in any field of endeavor in which valuables may be transported by vehicle from one location to another, such as when valuable documents, cash, jewelry, sensitive equipment, or other valuable items are hand-carried. As will be understood when reading the following description, the travel case may be a traveler's suitcase, a briefcase, an attaché case, an equipment case, or any other similar travel case.

CATASTROPHIC EVENT RESPONSIVE TRAVEL CASE WITH FLOTATION AND ALERTING

BACKGROUND

Travel today is full of delightful new experiences, but also fraught with terrifying new dangers. Terrorism and other threats to every mode of transportation appear almost daily. A travel case that protects one's possessions, the peace of mind of one's loved ones and possibly one's own life would be useful to today's world traveler.

SUMMARY

A travel case according to aspects of embodiments of the invention may include one or more of any of the following features and/or elements either individually or in combination. It is contemplated that the invention may include any combination and/or permutation of these features.

The travel case solves newly-recognized problems in the art in new ways. It has been observed that rescue and recovery of travelers and their belongings may be extremely difficult as a result of incidents of catastrophic accident or terrorism taking place in remote, often oceanic locations. These and other related problems were previously seen and addressed only from the point of view of improving or enhancing black box functionality to aid in the location of a downed aircraft, and the point of view of improving or enhancing the regular communication of aircraft location and navigation information to satellite and/or ground stations to pinpoint the path, speed, altitude, etc. of an aircraft immediately preceding a catastrophic incident. But, no one has considered that each passenger or piece of equipment carried aboard a plane, vessel, or vehicle may provide the means for self-rescue or, in the event of an utter catastrophe, location and recovery of the wreckage. The present invention may have application in any field of endeavor in which valuables may be transported by vehicle from one location to another, such as when valuable documents, cash, jewelry, sensitive equipment, or other valuable items are hand-carried. As will be understood when reading the following description, the travel case may be a traveler's suitcase, a briefcase, an attaché case, an equipment case, or any other similar travel case.

A travel case includes a case body defining an interior cavity in which to carry articles and an exterior shell; an inflatable floatation aid fixed to the exterior shell; an inflator in communication with the inflatable floatation aid, for inflation of the inflatable floatation aid; and a locator beacon fixed to the exterior shell, including a communications transmitter capable of signaling a remote party and a geo-locating apparatus. In a variation, the locator beacon employs a Global Navigation Satellite System (GNSS) to determine location. In a further variation, the GNSS is the US Global Positioning System (GPS). In yet further variation, the locator beacon employs radio tower triangulation to determine location. In another variation, the inflatable floatation aid is separable from the case body and fixed to the exterior shell by an extendible tether. In yet another variation, the inflator operates automatically. In a further variation, the inflator operates by introduction of water that may dissolve a pill-cage pill, or may operate by submersion, which may be detected via hydrostatic pressure sensing. In another variation, the locator beacon operates automatically responsive to operation of the inflator. In a further variation, the travel case further comprises: sensors sensitive to environmental parameters of the travel case; wherein the locator beacon operates automatically responsive to sensor inputs indicative of a catastrophic event. In a yet further variation, the sensors include at least one of a GPS locator, an accelerometer, and a magnetometer. In an even yet further variation, the travel case includes a processor that activates and prevents operation of the inflator and/or that activates and prevents operation of the locator beacon. In other variations, the locator beacon operates automatically on a periodic basis. In another variation, the locator beacon is connectable to a two-way, wireless data network, whereby the locator beacon can send and receive messages to a recipient endeavoring to locate the travel case after it has become lost. In a further variation, the locator beacon operates on demand, responsive to an operator. The locator beacon may be a search and rescue beacon operating on 121.5 MHz and/or 406 MHz, a beacon communicating with a cell-tower, a satellite phone service. In another variation, a programmable display affixed to the case body on which origin, destination, owner, and/or vessel identification information is displayed. In yet another variation, the programmable display is affixed to the inflatable floatation. In even yet another variation, the programmable display is of a type that retains on display a most recently programmed data set in the event of a power failure. The programmable display may be an electronic ink display.

In the following description reference is made to example implementations. It should be understood that other implementations are possible, and that these example implementations are intended to be merely illustrative.

DETAILED DESCRIPTION

Figure 1:
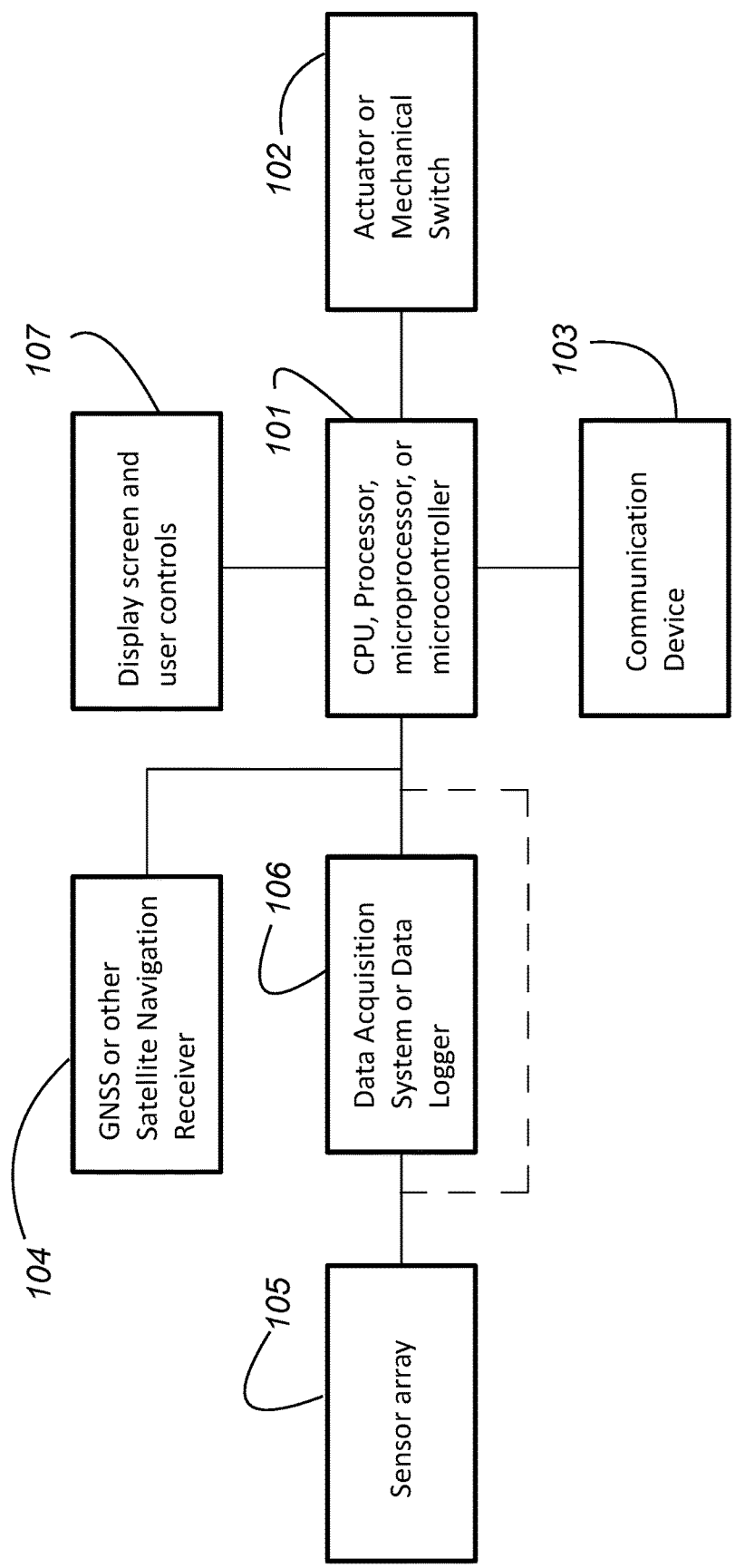
FIG. 1 is a block diagram of the electronic sensor and control system for aspects of the invention.
Figure 2:
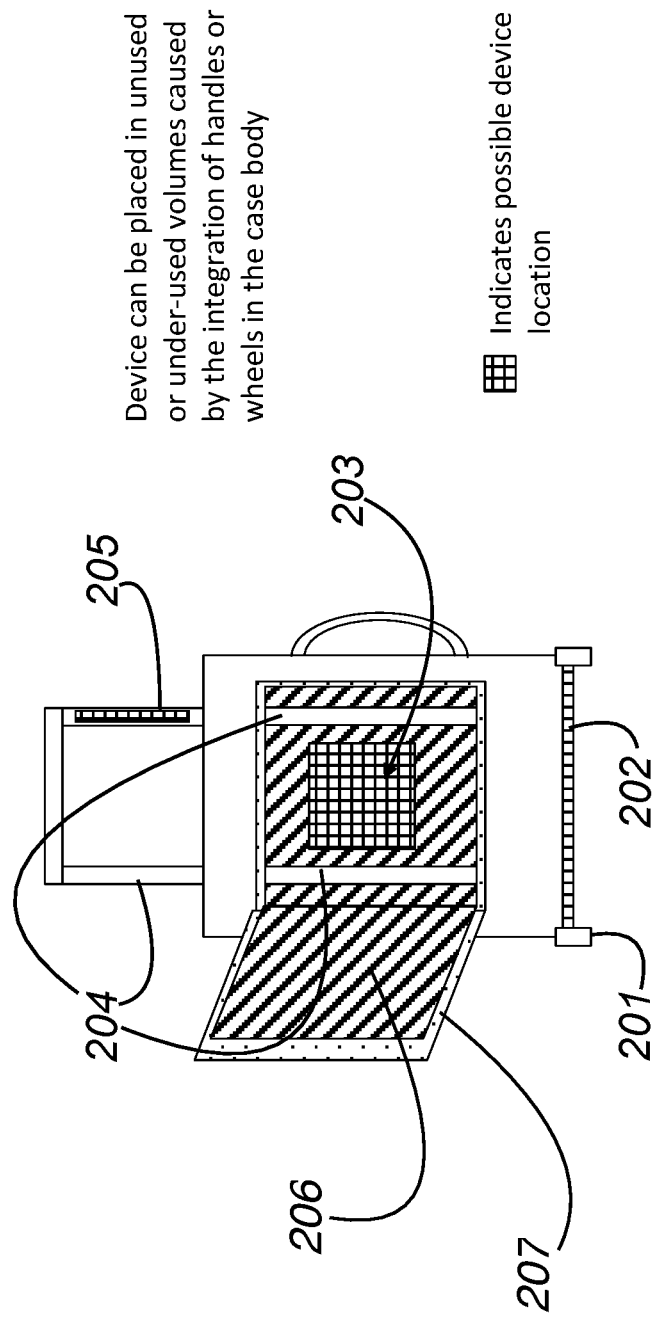
FIG. 2 is a front view of a travel case showing locations for packing elements of aspects of the invention.
Figure 3:
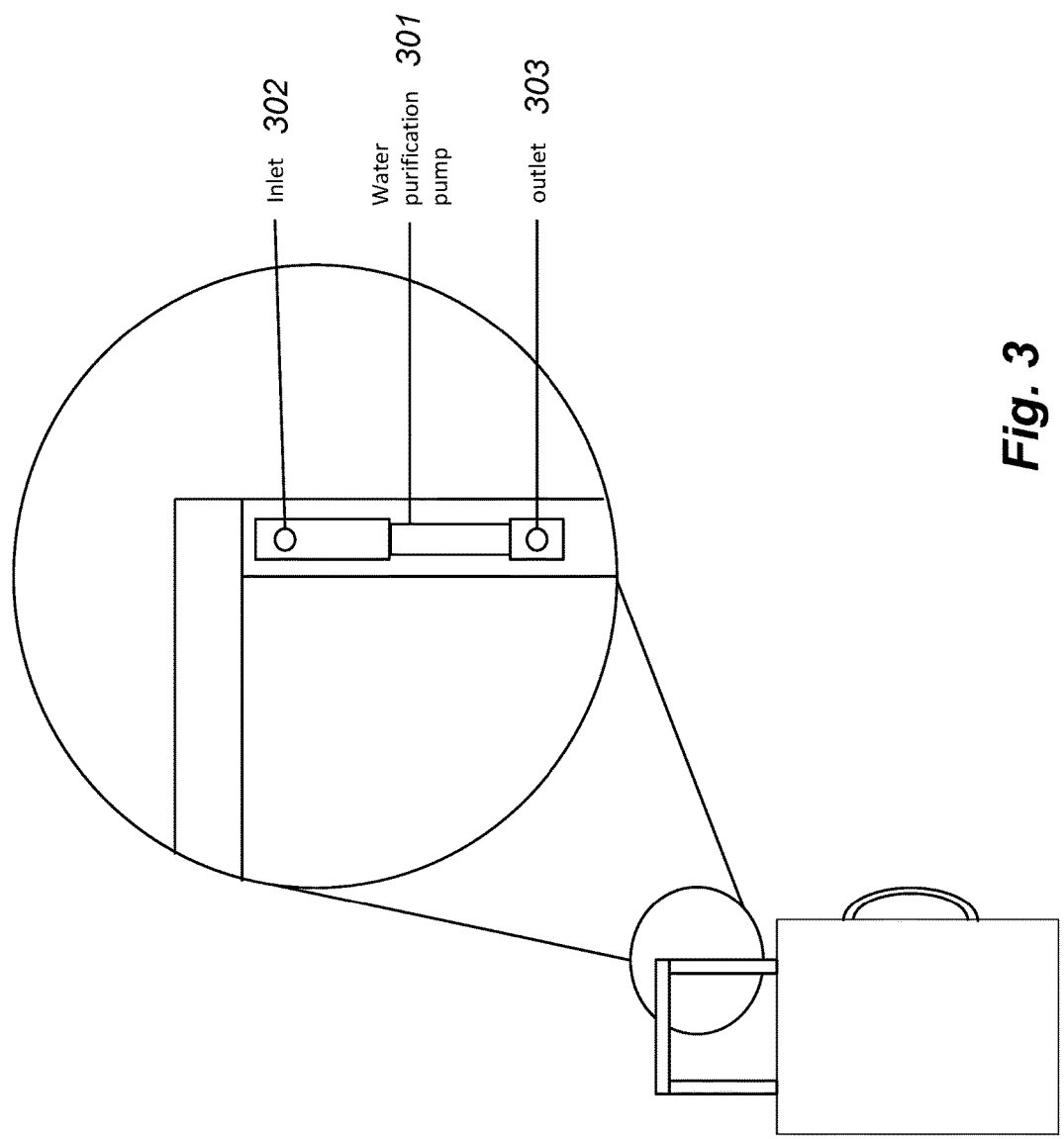
FIG. 3 is a front view of a travel case showing additional features of aspects of the invention.
Figure 4:
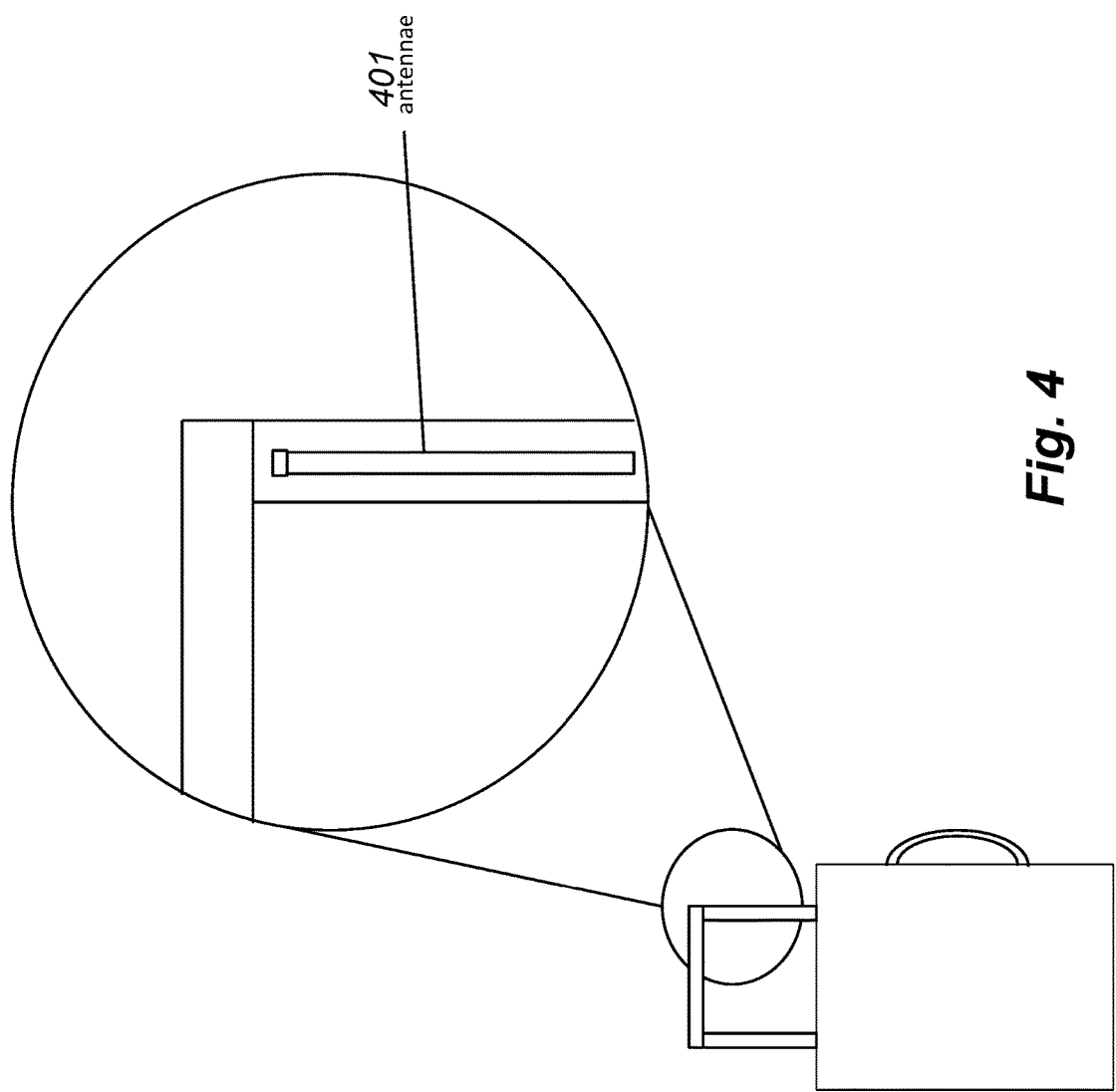
FIG. 4 is a front view of a travel case showing additional features of aspects of the invention.
Figure 5:
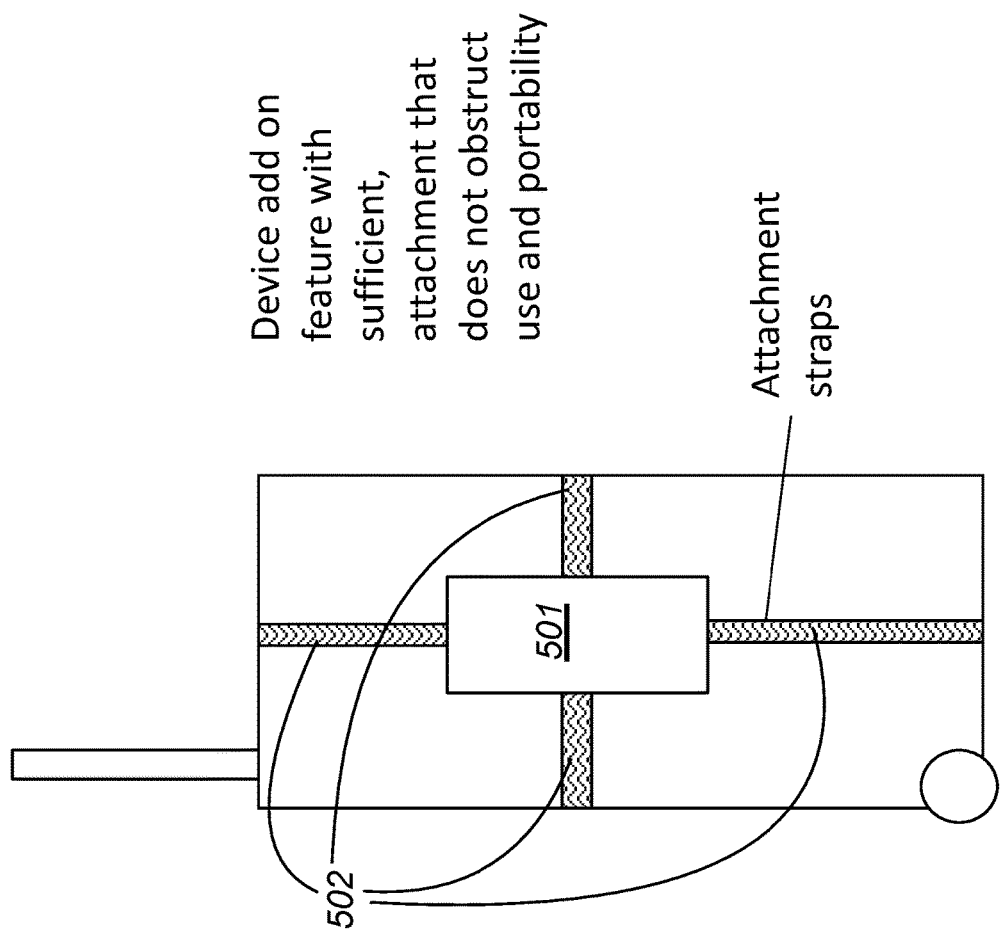
FIG. 5 is a side view of travel case showing an alternative mounting structure according to aspects of the invention.

The following section provides several illustrations of implementations of the travel case.

The travel case according to aspects of the present invention may include a number of features, including features that safeguard the travel case from sinking if separated from the vehicle in which it may be carried, and features that aid in identifying the location of the travel case if an unexpected or catastrophic event befalls the vehicle in which it may be carried, and features that communicate that location to potential search and rescue personnel or others in the event of a separation, unexpected, or catastrophic event.

The travel case of the present invention includes any desired combination of conventional components and aspects that will be described only briefly, here, to permit the inventive aspects to be understood more clearly. For example, the case may be based on a hard-shell design or soft-shell design. Cases to which the invention applies may include zipper closures, snap locks, keyed and combination locks, and other conventional closures employed on travel cases. Some travel cases to which the invention applies may include water resistant shells and closure seals providing any desired degree of water resistance from none at all to resistance to impact immersion and submersion to a set depth. Case interiors may include various packing aids and options, such as toiletry bags or compartments, lingerie pockets, folding frames and hangers for suits, shirts, and other clothing susceptible to creasing, etc. A special compartment accessible from the outside of the case may be provided to store emergency hydration and/or dry nutrition products. Hydration products may be stored in either a TSA-compliant one-quart package for liquids in 100 ml or smaller containers, or in a TSA-non-compliant manner if permitted for the travel plans of the user.

The term travel case should be understood to include cases for equipment, cases for special goods such as musical instruments or jewelry shipping containers, and other cases that generally resemble travel cases. Larger cases used as shipping containers for larger goods or larger quantities of good may also be considered to be travel cases for the purposes of this application. In general, travel cases are containers for personal articles, equipment, etc. that are small enough and light enough when loaded to be handled by an individual passenger or traveler. Excluded are containers whose primary purpose is to secure and deploy such safety equipment as EPIRBs, flight data recorders, vehicle data recorders, and the like.

Aspects of the invention include a travel case fitted with apparatus to provide individual passenger safety, tracking, and recovery features not found in conventional travel cases. Other aspects of the invention include other diverse and larger cases and containers fitted with apparatus providing additional safety, tracking, and recovery features not found in conventional cases and containers. Other aspects of the invention include methods for deploying safety, tracking, and recovery equipment and features from travel cases, other cases, and containers.

There has previously been no motivation to provide such functionality at an individual passenger level, in travel cases, because of several factors. One factor is the complete reliance in the transportation industry on vehicle-level systems, rather than passenger-level systems, which add cost and complexity, and were considered to have insufficient reliability for general reliance. Another factor is the space taken away from passenger luggage space to incorporate conventional safety equipment into typical travel cases. Yet another factor is the expectation that highly durable, specialty safety equipment is more likely to survive a catastrophic event than personal electronics or the like.

It is understood and intended that the aspects of the invention described below intrude minimally, if at all, into the packing volume of the travel case. Rather, the features described are designed to be flat and integrated with the hard or soft shell materials, or occupy volumes within the shell that are unused or under-used in conventional case designs, such as those volumes that become unusable due to the integration of handles or wheels in the case body.

Flotation

The exterior of the body of the travel case (See FIGS. 2, 3, 4, 5, 7, and 8) includes an inflatable bladder (702, 802), optionally covered by a suitably durable protective skin 206. The durable protective skin 206 may be formed with seams 207 designed to separate when the bladder (702, 802) expands. The seams 207 may be frangible, having weakened locations arranged to allow the expansion of the bladder when inflated, or the seams 207 may be releaseably fastened to the body of the travel case to achieve the same effect. The protective skin 207, if frangible, may be of any suitable material and construction, for example similar to the vinyl covering with sections separated by score-lines on the back used in connection with automotive supplemental restraint systems (SRSs, i.e., air bags). Releasable protective skins 206 may be fastened along seams 207 over the inflatable bladder using hook and loop fasteners (e.g., Velcro®), or using refastenable snaps, or using frangible rivets, for example made of plastic with scored or otherwise weakened shafts. Any other suitable releasable fastener may be used.

The inflatable bladder may be formed of a substantially gas-impermeable membrane of solid material, a composite matrix such as a coated fabric, or any other suitable material that is flexible, compact when uninflated, and substantially gas-impermeable. The inflatable bladder defines an enclosed volume, and has an edge defining an opening through which the bladder can be filled with a gas to provide buoyancy. One commonly used buoyancy-producing gas is $CO_2$. The bladder material should be substantially gas-impermeable to the particular gas selected, such as $CO_2$.

Attached and sealed to the opening of the bladder is an automatic inflator apparatus, such as used in conventional inflatable life vests and the like (not shown). The automatic inflator may use compressed $CO_2$ supplied in standard canisters, or another suitable gas source whose presence aboard commercial air carriers is permissible.

One basic criteria for operation of the automatic inflator apparatus is entry into a water environment. As discussed below, detection of a catastrophic event will supplement and/or mitigate operation of the automatic inflator. The water entry aspect of operation of the automatic inflator may be triggered by hydrostatic or hydrodynamic action, as desired. Introduction into the trigger apparatus of water, submersion of the trigger apparatus, or hydrostatic pressure observed at the trigger apparatus can trigger the inflator, in the presence of other suitable inputs described below, as desired. One suitable actuator (Secumar® actuators made by Bernhardt Apparatebau GmbH u. Co. of Holm, GERMANY) is a conventional pill-cage actuator triggered by dissolving a pill-shaped element when immersed for a sufficient time in water. Other suitable actuators triggered by a water-soluble element or link are known. Another suitable actuator (Hammar® actuators made by Hammar AB of Göteborg, SWEDEN) is a hydrostatic trigger activated by immersion of the actuator to a set depth of water, i.e., by water pressure of a set amount. Also suitable are electronic and electromechanical sensors that are not sensitive to the direction in which they are mounted or suspended, such as used to detect flooding in residential, industrial, and shipboard spaces, among others.

The entire floatation apparatus should produce sufficient buoyancy to keep the entire travel case at or near the surface of a range of typical salt- and fresh-water bodies found across the world at various temperatures. A typical minimum requirement might be somewhat above 50 lbs. (or, whatever the normal maximum weight of a fully-loaded piece of hand luggage for air travel might be at the time the travel case is designed). The floatation apparatus can be arranged to remain affixed to the surface of the travel case when deployed (see FIGS. 7 and 8), or can be tethered to the travel case (FIG. 9) such that when deployed the travel case is retained some distance below the water's surface, at which the buoyant floatation apparatus floats.

Figure 8:
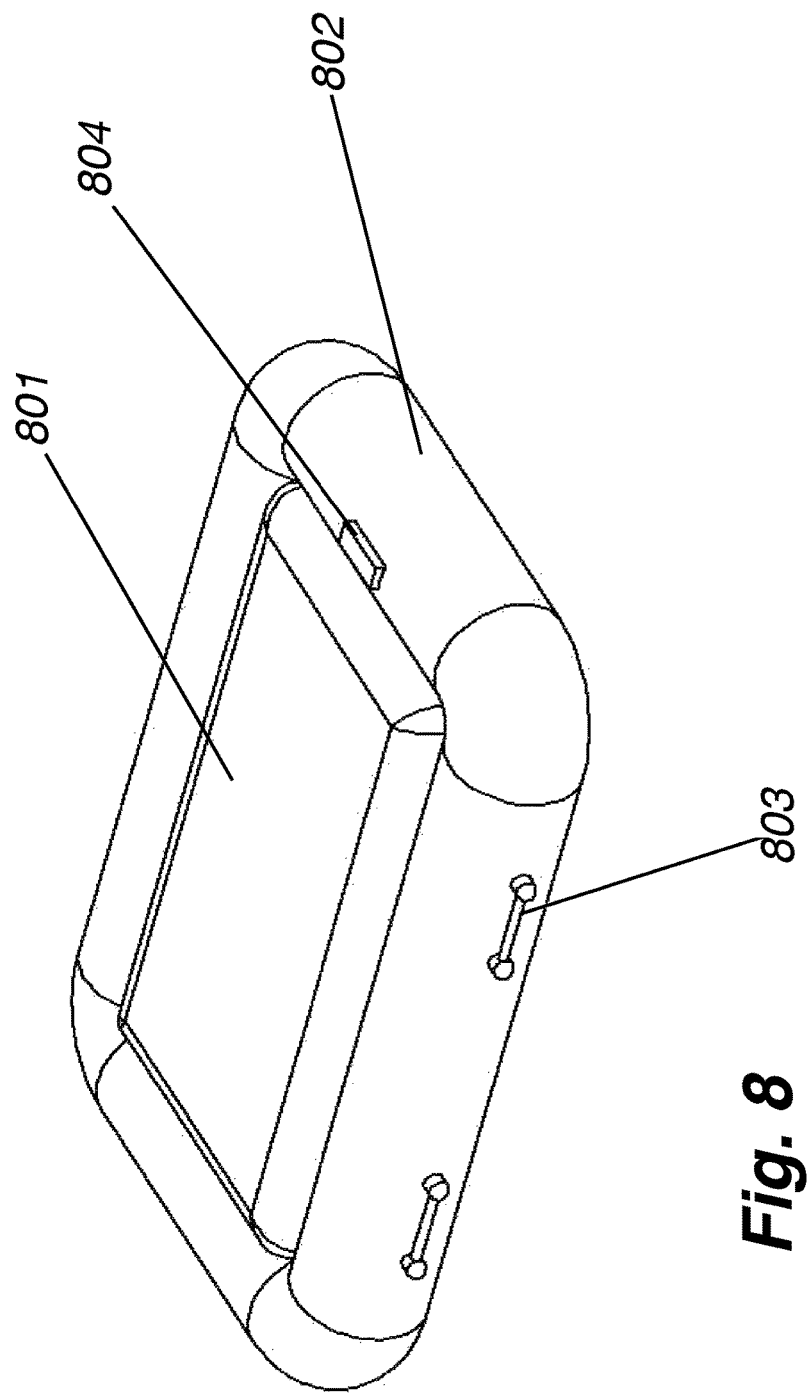
FIG. 8 is a perspective view of a travel case with floatation aid deployed according to aspects of the invention.
Figure 9:
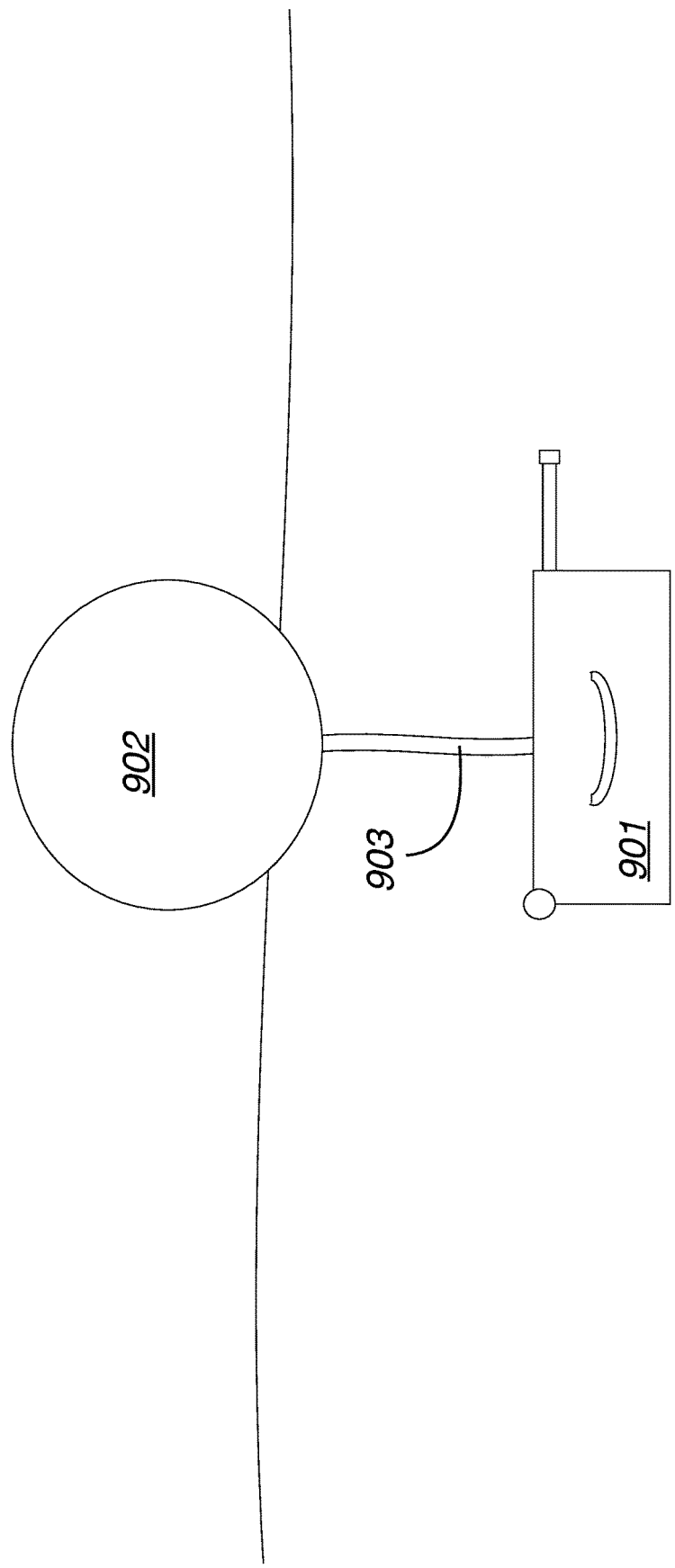
FIG. 9 is a profile view of a travel case suspended beneath a floatation aid.

If the floatation apparatus (FIG. 8, 802) is arranged to remain affixed to the surface of the travel case (FIG. 8, 801) when deployed, it may be further arranged to take on a roughly toroidal shape when inflated (see FIG. 8). The floatation apparatus 802 may be further arranged to occupy a specific region of the travel case 801 exterior, so as to keep the travel case 801 afloat in a known orientation, as shown in FIG. 8. Keeping the travel case afloat in a known orientation allows a user in distress to access a display (see FIG. 6), an emergency hydration water pump (FIG. 3, 301) having a water inlet (FIG. 3, 302) and a water outlet (FIG. 3, 303) and/or nutrition compartment, expose an antenna (see FIG. 4, 401) or any other suitable feature desired without necessarily having to reorient the travel case or causing it to become swamped when doing so.

Figure 7:
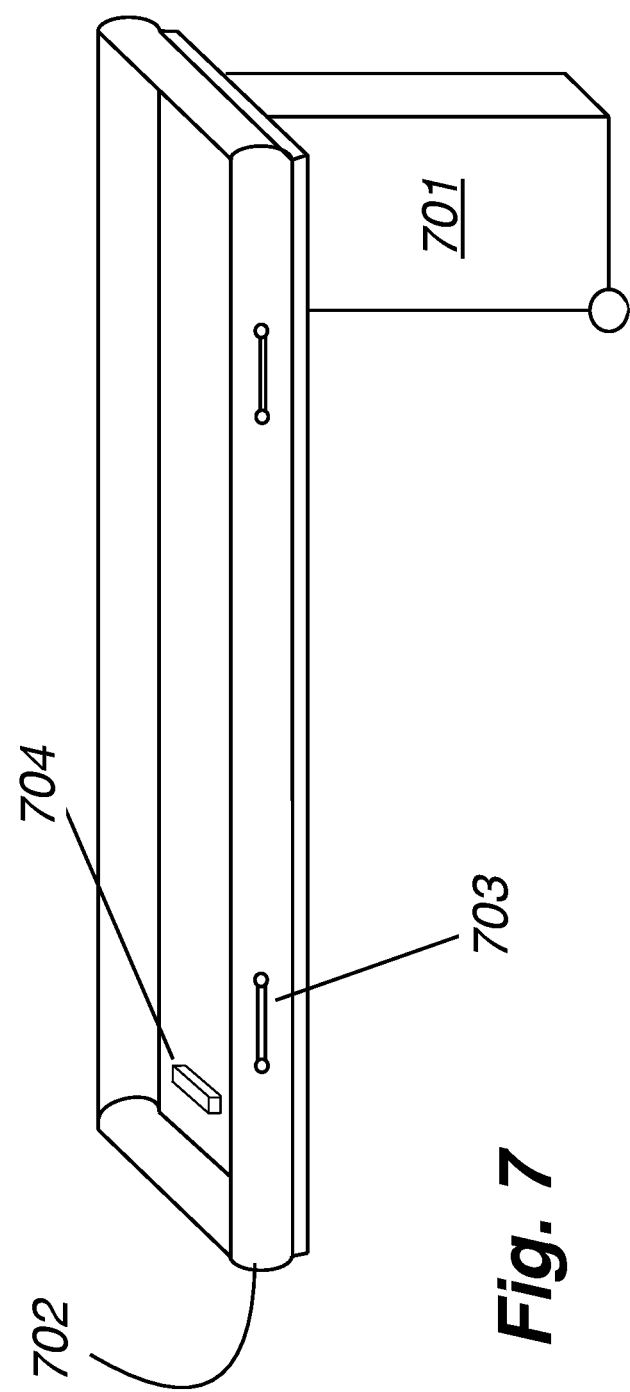
FIG. 7 is a perspective view of a large life raft deployed according to aspects of the invention.

If the floatation apparatus is provided with sufficient buoyancy, the travel case can provide personal floatation in the event the travel case is in reach of its owner at the time catastrophe strikes. In such instances, the floatation apparatus should include strapping, buckles, and looped handholds and/or footholds to facilitate fixing the floatation apparatus to the user, even after the user and the apparatus are in the water (FIGS. 7 and 8; 703 and 803). The floatation apparatus may further include such standard elements as a sound device, mirror, and/or immersion-activated steady or strobe light to assist in locating the travel case (FIGS. 7 and 8; 704 and 804).

Location-Finding

Location-finding apparatus may be also included, to aid in locating the travel case and other debris dispersed in a catastrophic event, as shown in FIG. 1. The location-finding apparatus 104 may include a satellite position finding receiver reliant on the US-based Global Positioning System (GPS), the Russian Global Navigation Satellite System (GLONASS), the Indian Regional Navigation Satellite System (IRNSS), the Chinese BeiDou-2 navigation satellite system, the European Galileo navigation satellite system, or any other Global Navigation Satellite System (GNSS) that may be available. The location-finding apparatus may also, or alternatively, include a ground-based position finding receiver using location information derived from known ground-based transmitters such as cell phone towers or the like. The location-finding apparatus may also, or alternatively, include a directional homing beacon that allows a suitably equipped search and rescue team to find the travel case once close to its location.

Figure 6:
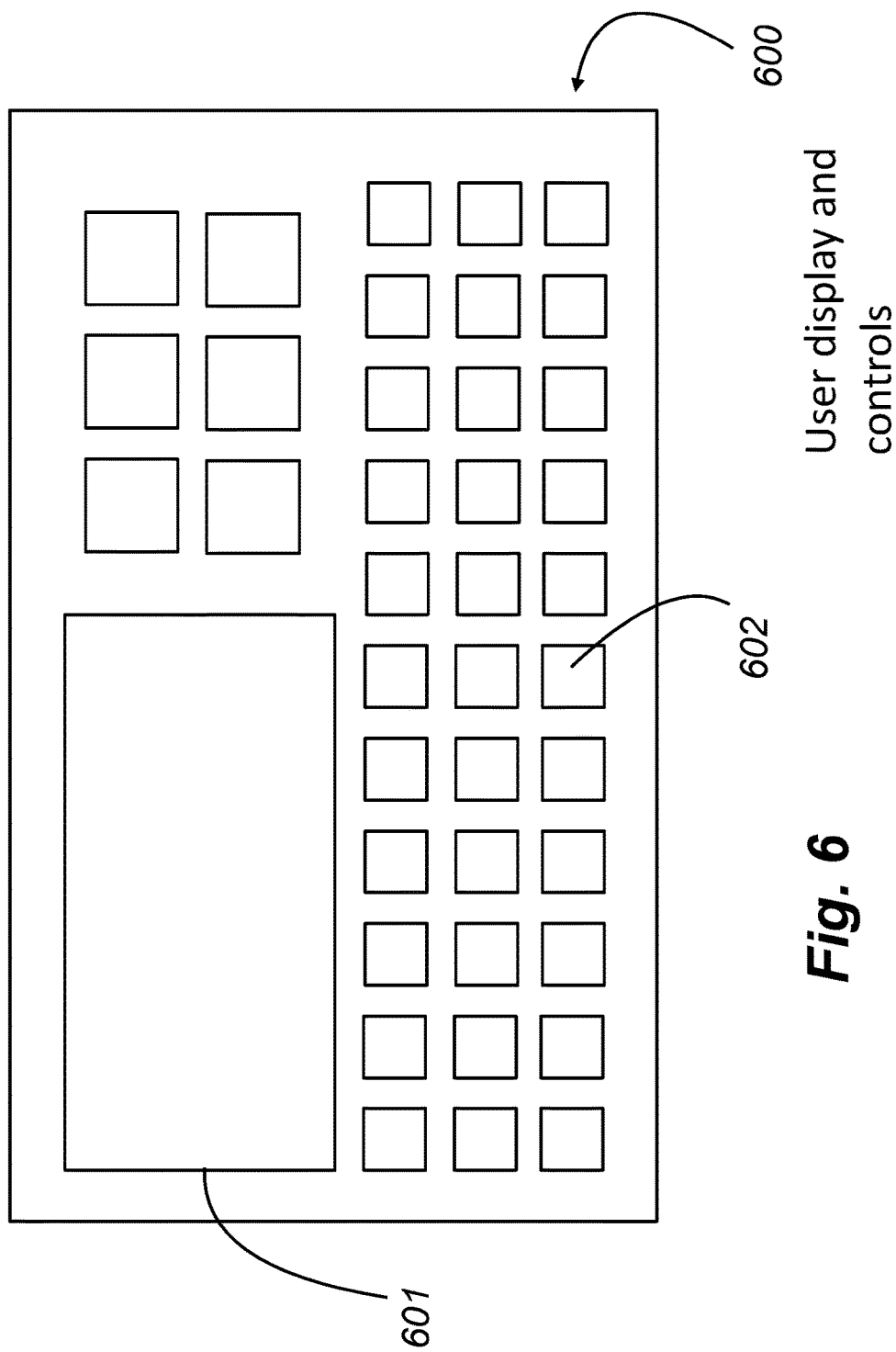
FIG. 6 is a front view of a control panel according to aspects of the invention.

The location finding apparatus can communicate the location found with an owner still in possession of the travel case through a control panel display 107 (see also FIG. 6). The display (FIG. 6, 601) may use mapping technology, or may simply display coordinates of latitude and longitude, or both. The display can be a volatile display type, such as liquid crystal display (LCD) or light emitting diode (LED), or can be a non-volatile display type such as an electronic ink display. The control panel (FIG. 6, 600) and all associated electronics should be sufficiently water resistant to withstand expected impact and/or immersion loading during and after a catastrophe. A small keyboard of keys 602 can be included to control or program various functionality including, for example, functionality to show the owner, the baggage tag for the destination during the current trip, scrolling around the map, adjusting sensitivity for different vehicle types, etc.

Figure 10:
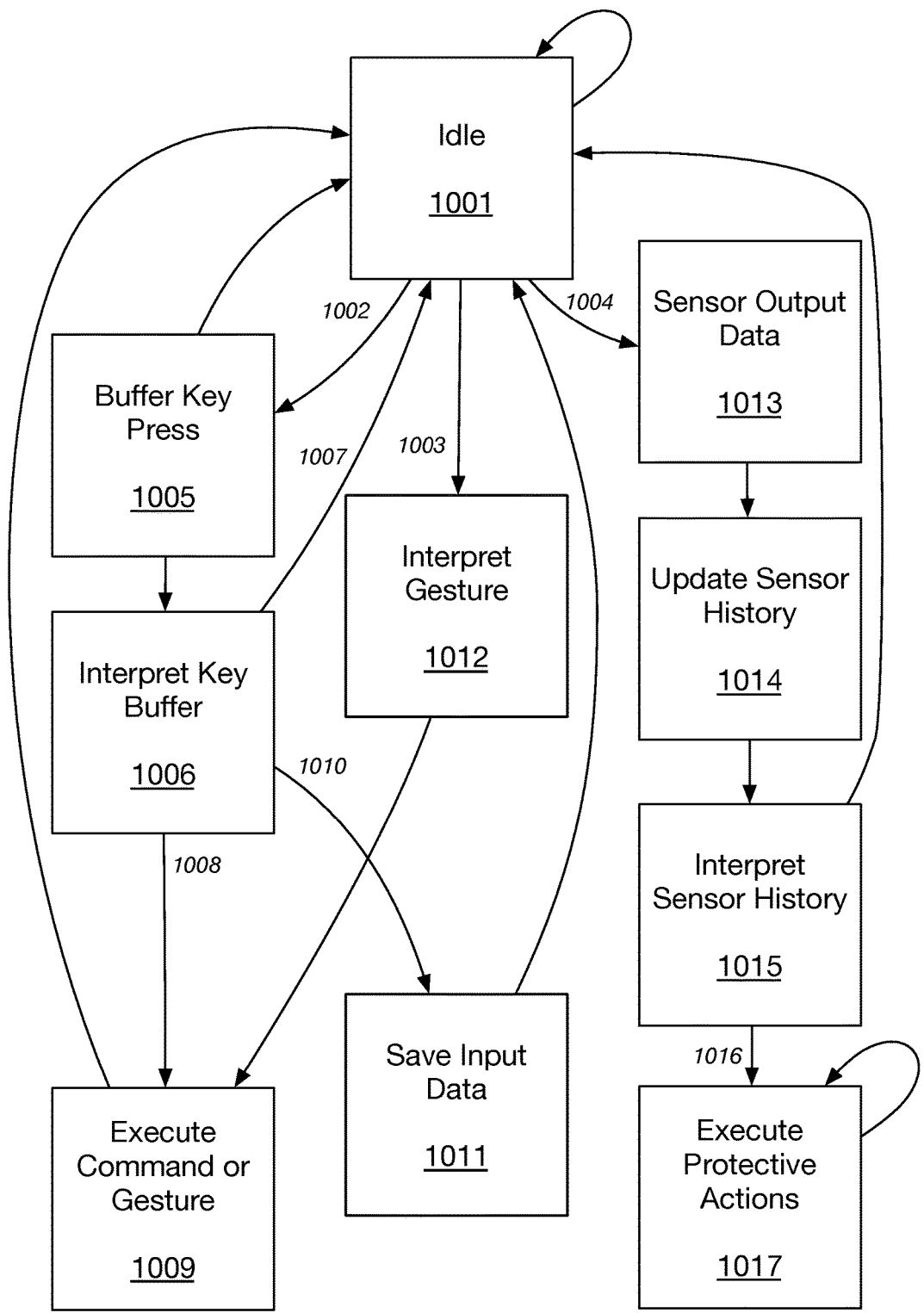
FIG. 10 is a state diagram illustrating the operation of the system controller software.

Control and interface software accessed through the control panel 600 is illustrated in FIG. 10. The exemplary control and interface software may be an interrupt-driven executive that waits in an idle state 1001 for the occurrence of an interrupt event representing one of a key press 1002, a screen gesture 1003, or a sensor input 1004. Absent one of the foregoing interrupts, control remains in the idle state 1001.

If the interrupt event was a key press 1002, then the key pressed is buffered 1005 in a key buffer memory. The contents of the key buffer are then interpreted 1006.

Some keystrokes or combinations do not signify anything because a complete command or item of data is not represented thereby; in that case control returns 1007 to the idle state 1001, while the keystrokes collected in the key buffer are retained until confirmed to be commands or data to be interpreted, or if confirmed but interpreted to be garbage are then flushed from the key buffer. Certain keystrokes or combinations of keystrokes are interpreted to be commands 1008, and cause the system to execute those commands 1009, such as displaying on the screen luggage tag information previously stored in data memory of the system. After commands are executed 1009, control returns to the idle state 1001.

In addition to commands to be executed, data can be input, such as the baggage tag and destination information for the current trip and the type of vehicle on which the travel case is to be carried. If the interpretation of the key buffer 1006 determines the content to be input data 1010, the data is then stored 1011, before returning to the idle state 1001.

If a touch screen or similar input device is included in control panel 600, then gestures received 1003 through the touch screen or similar input device are interpreted 1012. The gestures received and interpreted are then executed 1009 similarly to commands received by keystroke. Gestures may have meanings evident from elements of a Graphical User Interface (GUI) displayed on the control panel display or may cause other predefined manipulations of the system defined by the underlying GUI software. After gestures are executed 1009, control returns to the idle state 1001.

Each time the sensor suite produces new sensor values 1004, sensor output data 1013 is collected. This exemplary embodiment employs an interrupt-driven model, but a polled sensor system may also produce the sensor output data 1013 on a timed basis instead. The sensor output data is then stored in a memory, whereby sensor history data is updated 1014. Sensor history data is interpreted 1015, to determine whether the travel case is undergoing normal motion for the type of vehicle in which it is being carried, or whether the travel case is undergoing motion representative of a catastrophe befalling the vehicle in which it is being carried. If the interpretation is that a catastrophe has occurred 1016, then the processor will execute various protective actions 1017, such as triggering the inflation of the floatation apparatus or sending search and rescue system (SARS) messages or other communications indicating the status and/or location of the travel case. The case will remain in this state indefinitely until reset or the batteries expire.

The various inputs to the executive through the control panel 600 may affect such behaviors as displaying a virtual luggage tag on demand, applying different algorithms to sensor inputs in order to determine the occurrence of a catastrophic event, etc. User interface and executive software such as would be suitable for this application is well-known in the computing arts.

A subsystem can also be provided, if desired, by which the executive periodically flushes the buffers of data that is no longer current or relevant. For example, a timer can trigger a process to periodically, after a period of inactivity, or based on some other suitable criteria, stuff the key buffer with a command to flush buffers, in some implementations, thus overriding prior inputs and performing the necessary flush.

Figure 11:
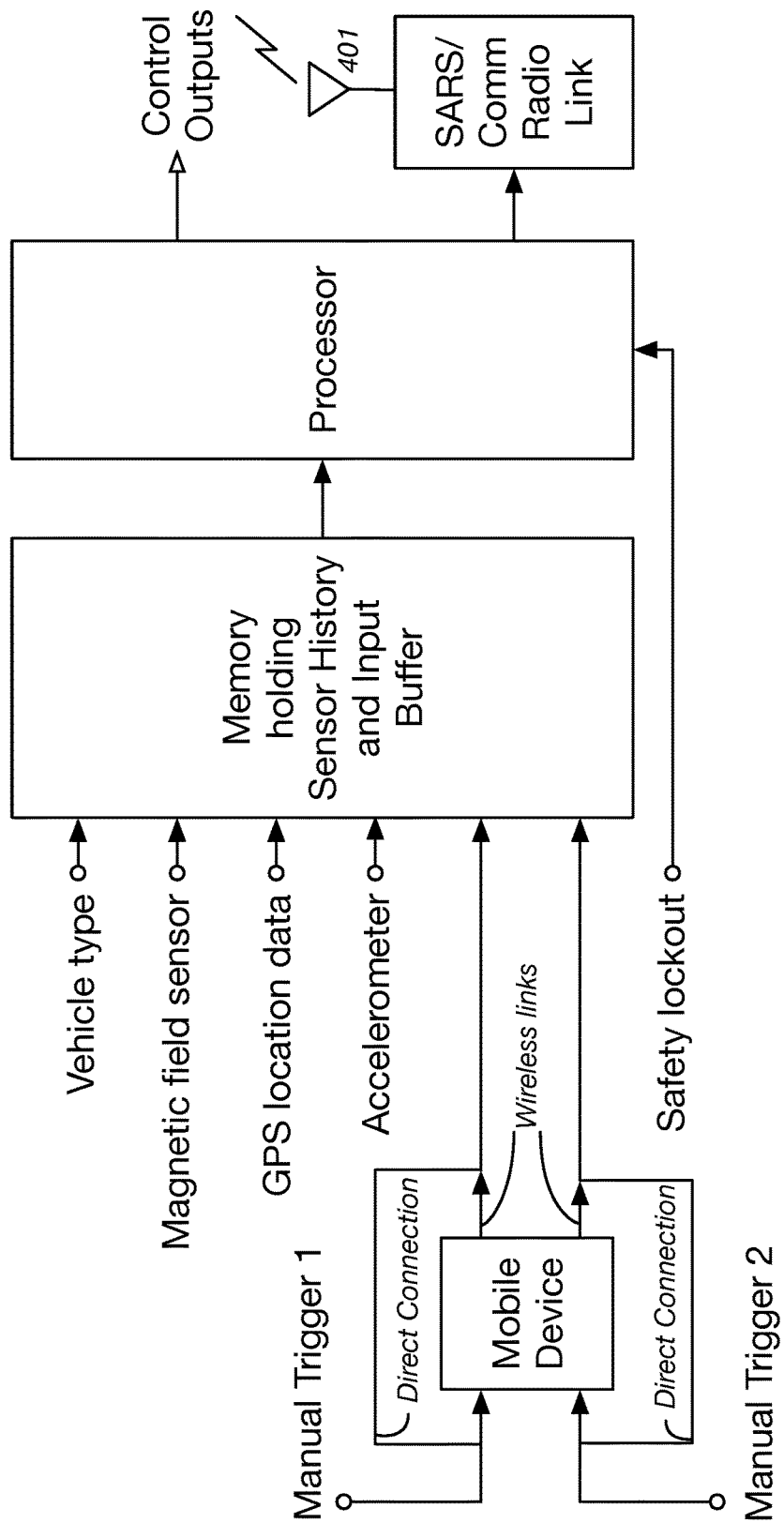
FIG. 11 is a block diagram illustrating the electronic data collection and processing system of the invention.

FIG. 11 is a block diagram illustrating the collection of sensor data and other inputs for processing into the useful outputs of the system of the travel case. Central to the input collection elements is a Memory holding Sensor History and Input Buffer. The inputs may include one or more of a Vehicle type, for example entered via control panel 600 as described elsewhere, herein; a Magnetic field sensor signal giving three-axis magnetic field values; a GPS location data signal giving decoded, three-dimensional global position data; an Accelerometer signal giving three-axis acceleration values; Manual Trigger 1 and Manual Trigger 2 signals that allow a user to force actuation of the system by simultaneous activation of both of the Manual Trigger 1 and 2 signals; and, a Safety lockout signal that prevents output of the Control outputs and activation of the SARS/Comm Radio Link by the Processor. Manual Triggers 1 and 2 can be asserted either by direct input to the system as shown by the Direct Connections, or by wireless input via the Mobile Device and the Wireless links. The system of FIG. 11 activates the inflation mechanism, sends emergency location, search and rescue, and other communication messages, and performs other such functions as described elsewhere, herein.

In order for the antenna 401 of the location finding apparatus to be exposed to the satellites or towers from which location information is derived, the location finding apparatus is attached to that part of the travel case that will float at the water's surface and remain oriented above the water's surface as described above. It should be affixed to that component in such a way as to face up when deployed as a result of a catastrophe. If the floatation apparatus is tethered to the travel case, which is retained below the surface, the location finding apparatus is suitably attached to the floatation apparatus. If the floatation apparatus is affixed to the travel case to form a unit that floats entirely at the surface, the location finding apparatus should be affixed to a surface of the case that the floatation apparatus causes to float upwardly as described above.

Communication

In order to communicate the location of the travel case to friends, relatives, search and rescue teams, or others, the location finding apparatus should be connected to communication gear that could send a message by a suitable channel (FIG. 1, 103). Suitable channels can include satellite channels used by search and rescue teams on 121.5 MHz and/or 406 MHz, Very High Frequency (VHF) emergency channels including the Digital Selective Calling (DSC) service channel, Single Side-Band channels, cell phone voice or data channels, satellite phone voice or data channels, or any other channel through which an automated emergency message could be communicated.

Catastrophe Detection

The travel case can include sensors (FIG. 1, 105) and a processor (FIGS. 1, 106 and 101) that detect environmental changes indicative of the occurrence of a catastrophic event. Sensors may include GPS, accelerometers, magnetometers, microphones, detectors of the state of the inflation trigger, and others that are readily available and can detect movements or other environmental changes indicative of a catastrophic event warranting operation of the features of the travel case. The processor 106 and 101 receives inputs from the various sensors 105, and through its configuration and programming computes the likelihood that a catastrophic event has occurred. The processor has outputs connected to the location finding apparatus 104 and/or the inflation trigger 102 for the floatation apparatus. The processor may also have an output (not shown) combined with the inflation trigger 102 produces a sonic location ping for locating the device when submerged.

Figure 12:
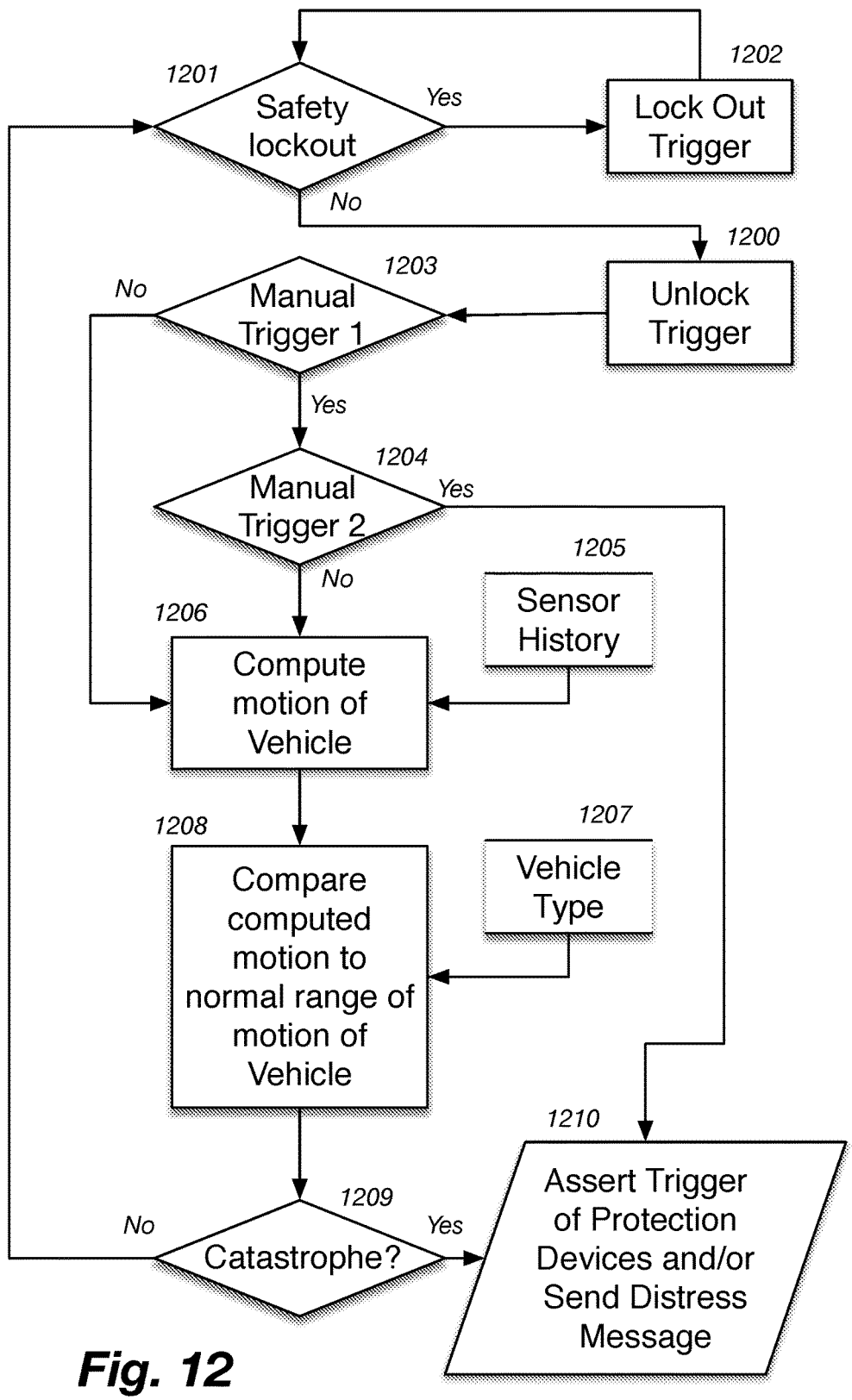
FIG. 12 is a flow chart illustrating the operation of the catastrophe detection software.

The software that receives the sensor input history and performs the analysis of that history is illustrated by the flow diagram of FIG. 12.

The software illustrated in FIG. 12 operates in a continuous loop. At the top of the loop is a sub-loop in which the software checks 1201 for the assertion of the Safety lockout signal, and if present, locks out 1202 the outputs of the Processor that control the various protection devices described elsewhere, herein. If the Safety lockout signal is not asserted, the lock out is removed 1200, and control passes to tests 1203 and 1204 for the assertion of each of the signals Manual Trigger 1 and Manual Trigger 2. If both Manual Trigger 1 and 2 are asserted, then the protections and communications mechanisms of the system are triggered 1210. If at least one of Manual Trigger 1 and 2 are deasserted, then the motion of the vehicle is computed 1206 from the Sensor History 1205. Next, the vehicle motion computed is compared 1208 to the normal range of motion for the Vehicle Type 1207. If a catastrophe is determined to be in progress 1209, then the protections and communications mechanisms of the system are triggered 1210.

During periods of time when the processor determines that a catastrophic event is unlikely to have occurred, the processor outputs may include inhibit signals amongst the output signals and operational controls provided to the inflation apparatus and the location finding apparatus. The inhibit signals would prevent deployment of the inflation apparatus and prevent communication by the location finding apparatus of an emergency message. During periods of time during or after determining that a catastrophic event is likely to have occurred, the processor may enable operation of the inflation apparatus and the location finding apparatus by similar output signals and operational controls, but with inverse significance. Operation of the inflation apparatus may be controlled by the processor (as described above) or may provide a control input to the processor indicative of the existence of a state of catastrophe, depending on the desired behavior of the travel case.

The location finding apparatus can optionally operate automatically on a periodic basis either instead of or in addition to being controlled by the processor. In addition, the user can manually operate the location finding apparatus using control panel 600, for example to check location and/or send an "OK" message through a non-emergency channel or an emergency message through an emergency channel. The user simply enters suitable, pre-determined commands through the executive program 1000 using the control panel 600 as described above to trigger the desired message.

The executive program 1000 can receive manual commands and activate desired operations if a person with the travel case observes a catastrophic event. For example, if a person with the travel case observes a hijacking in progress on board an aircraft on which they are travelling, the person can enter commands to initiate an emergency message transmission and/or arm the inflation actuator. The command can be entered through the control panel 600 and the executive software 1000. Amongst its communication channels, the travel case can include a Bluetooth or other short-range wireless communication channel by which commands to the executive program 1000 can be transmitted via a cell phone or another mobile device. (See also, FIG. 11, Mobile Device.)

System Operation

The travel case can function as a fully integrated system capable of providing one or more of the following functions: detecting and alerting others to an incipient or ongoing catastrophic event; protecting contents from environmental damage; aiding in the location of a vehicle, its contents, and/or its passengers after suffering a catastrophic event; and providing some level of support to survivors of a catastrophic event. In order to function as such a fully integrated system, a number of the components parts described above should be constructed and arranged to cooperate to produce desired functional results.

The components responsible for detecting a catastrophe may be integrated with those for sending an alert and/or those for triggering deployment of a floatation aid. These components must function without interfering with the operation of the vehicle in which the travel case is carried and without raising any security concerns with respect to the vehicle.

For example, premature or unneeded deployment of the floatation aid should be avoided. This may be accomplished through the use of multiple sensors and well-developed algorithms for characterizing the environment and circumstances over time of the travel case. An immersion trigger has been suggested above as an appropriate sensor and trigger system for deploying floatation when the travel case is immersed in water. A more robust system could arm the immersion trigger only when GPS position information indicates passage over water or when incremental changes in GPS position information indicate an erratic or otherwise unusual travel path of the vehicle. Another more robust system could arm the immersion trigger when accelerometers detect unexpected or unusual sudden changes in velocity (speed and/or direction). A simple pressure switch system on the handle(s) of the travel case could prevent arming of the immersion trigger while the case is being hand-carried, and permit arming of the immersion trigger when the case is set down or loaded into the vehicle.

Travel cases of various sizes could accommodate the inventive system. For example, cases for airline passengers' personal articles could incorporate some or all of the features described, and be small and free enough within the airline cabin to either be carried out with a passenger in an emergency, or to float free in the event of a massively destructive event. The low mass of such small items would help preserve them in a high-energy, destructive event, allowing them to serve their function of aiding in the location of the remains of such an event. Larger suitcases and equipment cases could incorporate additional features, larger battery power supplies, and larger, more versatile, rescue features, such as rudimentary rescue raft flotation.

Use of the invention both for personal possessions of travelers and for other articles transported in portable cases could reduce insurance rates for those forms of transportation of small articles and provide additional management controls to logistics managers responsible for the transportation of such small articles. The limited size and weight of the cases, for example suitcases carried by air are often limited to 50 lbs, reduces the energy required to be absorbed by the case upon an impact. This has resulted for example in passenger possessions being amongst the articles recovered intact from an otherwise catastrophic aircraft loss.

Various combinations of the foregoing features and elements can be made, and are contemplated as within the scope of the present invention.

What is claimed is:

1. A travel case comprising:
   a case body defining an interior cavity in which to carry articles and an exterior shell, having a mass and volume when fully loaded with articles suitable for an individual to carry;
   an inflatable floatation aid fixed to the exterior shell;
   an inflator in communication with the inflatable floatation aid, constructed and arranged to automatically without user intervention inflate the inflatable floatation aid with buoyancy-producing material; and
   a locator beacon fixed to the exterior shell, including a communications transmitter capable of signaling a remote party and a geo-locating apparatus;
   sensors sensitive to plural environmental parameters of the travel case;
   wherein the locator beacon and the inflator operate automatically responsive to plural sensor inputs which combined are indicative of a catastrophic event.

2. The travel case of claim 1, wherein the locator beacon employs a Global Navigation Satellite System (GNSS) to determine location.

3. The travel case of claim 2, wherein the GNSS is the US Global Positioning System.

4. The travel case of claim 1, wherein the locator beacon employs radio tower triangulation to determine location.

5. The travel case of claim 1, wherein the inflatable floatation aid is separable from the case body and fixed to the exterior shell by an extendible tether.

6. The travel case of claim 1, wherein the inflator operates by introduction of water.

7. The travel case of claim 6, wherein the introduction of water dissolves a pill-cage pill.

8. The travel case of claim 6, wherein the introduction of water includes submersion.

9. The travel case of claim 8, wherein the submersion is detected via hydrostatic pressure sensing.

10. The travel case of claim 1, wherein the locator beacon further operates automatically responsive to operation of the inflator.

11. The travel case of claim 1, wherein the sensors include at least one of a GPS locator, an accelerometer, a microphone and a magnetometer.

12. The travel case of claim 11, further including a processor that activates and prevents operation of the inflator.

13. The travel case of claim 11, further including a processor that activates and prevents operation of the locator beacon.

14. The travel case of claim 1, wherein the locator beacon operates automatically on a periodic basis.

15. The travel case of claim 1, further comprising:
   the locator beacon connectable to a two-way, wireless data network, whereby the locator beacon can send and receive messages to a recipient endeavoring to locate the travel case after it has become lost.

16. The travel case of claim 15, wherein the locator beacon operates on demand, responsive to an operator.

17. The travel case of claim 1, the locator beacon further comprising:

a search and rescue beacon operating on 121.5 MHz and/or 406 MHz.

18. The travel case of claim 1, the locator beacon further comprising:
a beacon communicating with a cell-tower.

19. The travel case of claim 1, the locator beacon further comprising:
a satellite phone service.

20. The travel case of claim 1, further comprising:
a programmable display affixed to the case body on which origin, destination, owner, and/or vessel identification information is displayed.

21. The travel case of claim 20, wherein the programmable display is affixed to the inflatable floatation.

22. The travel case of claim 20, wherein the programmable display is of a type that retains on display a most recently programmed data set in the event of a power failure.

23. The travel case of claim 22, wherein the programmable display is an electronic ink display.

24. A method of deploying safety, tracking, or recovery apparatus from a vehicle transporting articles desired to be moved from a source location to a destination location, comprising:
providing a travel case in which articles desired to be moved are carried;
integrating safety, tracking, or recovery apparatus with the travel case;
detecting a catastrophic event occurring to the vehicle using the integrated apparatus, without user intervention, the catastrophic event defined by plural environmental parameters; and
deploying the safety, tracking, or recovery apparatus from the travel case upon detecting the catastrophic event using the integrated apparatus, without user intervention, and using the plural environmental parameters.

25. The method of claim 24, wherein detecting the catastrophic event comprises:
evaluating a history of inputs from at least one of a GPS locator, an accelerometer, a microphone, and a magnetometer.

26. The method of claim 25, wherein deploying further comprises:
triggering deployment of a floatation device upon immersion in water.

27. The method of claim 26, wherein deploying further comprises:
triggering a search and rescue communication beacon transmission.

* * * * *